United States Patent
Dybsetter et al.

(10) Patent No.: US 8,200,095 B2
(45) Date of Patent: Jun. 12, 2012

(54) MULTI-LEVEL MEMORY ACCESS IN AN OPTICAL TRANSCEIVER

(75) Inventors: Gerald L. Dybsetter, Scotts Valley, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 601 days.

(21) Appl. No.: 11/073,827

(22) Filed: Mar. 7, 2005

(65) Prior Publication Data

US 2005/0196165 A1  Sep. 8, 2005

Related U.S. Application Data

(60) Provisional application No. 60/550,544, filed on Mar. 5, 2004.

(51) Int. Cl.
*H04B 10/00* (2006.01)
(52) U.S. Cl. ...................................... 398/135
(58) Field of Classification Search .............. 398/22, 398/128, 135, 136, 137, 138, 139, 107, 115
See application file for complete search history.

(56) References Cited

U.S. PATENT DOCUMENTS

| | | | | |
|---|---|---|---|---|
| 4,937,736 A | * | 6/1990 | Chang et al. | 711/208 |
| 5,524,243 A | | 6/1996 | Gheorghiu | |
| 5,796,943 A | * | 8/1998 | Fujioka | 726/19 |
| 5,822,749 A | * | 10/1998 | Agarwal | 1/1 |
| 5,892,922 A | * | 4/1999 | Lorenz | 709/238 |
| 5,912,897 A | | 6/1999 | Steinbach | |
| 5,956,168 A | | 9/1999 | Levinson et al. | |
| 5,978,952 A | | 11/1999 | Hayek et al. | |
| 6,012,109 A | | 1/2000 | Schultz | |
| 6,032,160 A | | 2/2000 | Lehman | |
| 6,076,183 A | | 6/2000 | Espie et al. | |
| 6,259,702 B1 | | 7/2001 | Yamamoto | |
| 6,259,703 B1 | * | 7/2001 | Gray | 370/458 |
| 6,378,023 B1 | | 4/2002 | Christie et al. | |
| 6,446,145 B1 | | 9/2002 | Har et al. | |
| 6,535,743 B1 | | 3/2003 | Kennedy, III et al. | |
| 6,554,492 B2 | * | 4/2003 | Gilliland et al. | 385/88 |
| 6,643,818 B1 | | 11/2003 | Valk | |
| 6,658,437 B1 | | 12/2003 | Lehman | |

(Continued)

FOREIGN PATENT DOCUMENTS

WO   WO 2005/088462   9/2005

OTHER PUBLICATIONS

U.S. Appl. No. 11/074,109, filed Mar. 7, 2005 entitled "Byte-Configurable Memory in an Optical Transceiver."

(Continued)

*Primary Examiner* — Kenneth N Vanderpuye
*Assistant Examiner* — Hibret Woldekidan
(74) *Attorney, Agent, or Firm* — Maschoff Gilmore & Israelsen

(57) ABSTRACT

A mechanism that enables an optical transceiver to grant access to its memory on a per-segment basis. The optical transceiver includes a processor, system memory and a memory access table. The memory access table is comprised of access entries, each of which defines the access condition for a corresponding segment of memory. The processor reads the access entries for a particular segment of the memory. The processor or other optical transceiver component then determines whether or not to grant access to the memory segment based on the access entry read by the processor. Different levels of access control may be accommodated.

24 Claims, 5 Drawing Sheets

Access Entry Definition 300

| E₇ | M₆ | M₅ | D₄ | R₃ | R₂ | W₁ | W₀ | Access Settings 310 | Abbreviation 320 |
|---|---|---|---|---|---|---|---|---|---|
| 1 | 0 | 0 | x | x | x | x | x | Non volatile Memory | MN |
| 1 | 0 | 1 | x | x | x | x | x | Volatile Memory | MV |
| 1 | 1 | 0 | x | x | x | x | x | Processor Attention 0 (volatile mem) | MA0 |
| 1 | 1 | 1 | x | x | x | x | x | Processor Attention 1 (volatile mem) | MA1 |
| 1 | x | x | 0 | x | x | x | x | Device ID 0 | D0 |
| 1 | x | x | 1 | x | x | x | x | Device ID 1 | D1 |
| 1 | x | x | x | 0 | 0 | x | x | Read by All (not protected) | RA |
| 1 | x | x | x | 0 | 1 | x | x | Read by Password 1 or 2 or 3 | R1 |
| 1 | x | x | x | 1 | 0 | x | x | Read by Password 2 or 3 | R2 |
| 1 | x | x | x | 1 | 1 | x | x | Read by Password 3 | R3 |
| 1 | x | x | x | x | x | 0 | 0 | Write by All (not protected) | WA |
| 1 | x | x | x | x | x | 0 | 1 | Write by Password 1 or 2 or 3 | W1 |
| 1 | x | x | x | x | x | 1 | 0 | Write by Password 2 or 3 | W2 |
| 1 | x | x | x | x | x | 1 | 1 | Write by Password 3 | W3 |

U.S. PATENT DOCUMENTS

| | | | |
|---|---|---|---|
| 6,775,781 B1* | 8/2004 | Phillips et al. | 726/4 |
| 6,826,369 B1* | 11/2004 | Bondarev et al. | 398/107 |
| 6,826,658 B1* | 11/2004 | Gaither et al. | 711/150 |
| 6,836,493 B2* | 12/2004 | Mahowald et al. | 372/38.01 |
| 6,925,546 B2 | 8/2005 | Krejsa | |
| 6,957,021 B2* | 10/2005 | Aronson et al. | 398/137 |
| 6,981,125 B2 | 12/2005 | Emmes | |
| 6,983,355 B2 | 1/2006 | Ripberger et al. | |
| 7,043,640 B2* | 5/2006 | Pritchard et al. | 713/184 |
| 7,107,414 B2* | 9/2006 | Hidai et al. | 711/154 |
| 7,158,477 B2 | 1/2007 | Fatica et al. | |
| 7,215,891 B1* | 5/2007 | Chiang et al. | 398/137 |
| 7,233,998 B2* | 6/2007 | Suzuoki et al. | 709/230 |
| 7,289,045 B1 | 10/2007 | Walls et al. | |
| 7,295,750 B2* | 11/2007 | Ekkizogloy et al. | 385/147 |
| 7,296,127 B2* | 11/2007 | Safranek et al. | 711/163 |
| 7,441,061 B2 | 10/2008 | Gilligan | |
| 7,570,887 B2* | 8/2009 | Rohrer et al. | 398/73 |
| 7,801,449 B2* | 9/2010 | Hahin et al. | 398/135 |
| 7,860,952 B2* | 12/2010 | Haulin et al. | 709/220 |
| 7,881,615 B2* | 2/2011 | Mei | 398/136 |
| 7,957,651 B2* | 6/2011 | Ekkizogloy et al. | 398/140 |
| 7,974,538 B2* | 7/2011 | Hahin et al. | 398/138 |
| 8,090,265 B2* | 1/2012 | Dybsetter et al. | 398/135 |
| 2002/0016942 A1 | 2/2002 | MacLaren et al. | |
| 2002/0080798 A1* | 6/2002 | Hariguchi et al. | 370/395.31 |
| 2003/0097608 A1 | 5/2003 | Rodheffer et al. | |
| 2003/0177319 A1 | 9/2003 | de Jong | |
| 2003/0208658 A1 | 11/2003 | Magoshi | |
| 2003/0229765 A1 | 12/2003 | Suzoki et al. | |
| 2004/0022537 A1 | 2/2004 | Mecherle et al. | |
| 2004/0081424 A1* | 4/2004 | Moriwaki et al. | 385/147 |
| 2004/0126111 A1 | 7/2004 | Cho et al. | |
| 2004/0132956 A1 | 7/2004 | Hamao et al. | |
| 2004/0136719 A1 | 7/2004 | Hidai et al. | |
| 2004/0136722 A1 | 7/2004 | Mahowald et al. | |
| 2004/0162079 A1 | 8/2004 | Koshino et al. | |
| 2004/0162956 A1* | 8/2004 | Hidai et al. | 711/164 |
| 2004/0202476 A1* | 10/2004 | Woolf et al. | 398/135 |
| 2005/0015540 A1* | 1/2005 | Tsai et al. | 711/103 |
| 2005/0196165 A1 | 9/2005 | Dybsetter et al. | |
| 2006/0007905 A1 | 1/2006 | Yach et al. | |
| 2006/0034612 A1 | 2/2006 | Yu et al. | |
| 2006/0147216 A1 | 7/2006 | Dybsetter et al. | |
| 2006/0193631 A1* | 8/2006 | Gilligan | 398/58 |
| 2006/0198635 A1 | 9/2006 | Emery et al. | |
| 2007/0002773 A1 | 1/2007 | Wang et al. | |
| 2007/0079185 A1 | 4/2007 | Totolos | |

OTHER PUBLICATIONS

U.S. Appl. No. 11/073,886, filed Mar. 7, 2005 entitled "Consistency Checking Over Internal Information in an Optical Transceiver."
U.S. Appl. No. 11/074,109, Dec. 24, 2008, Non-Final Office Action.
U.S. Appl. No. 11/074,109, Jun. 27, 2008, Non-Final Office Action.
U.S. Appl. No. 11/074,109, Nov. 8, 2007, Non-Final Office Action.
U.S. Appl. No. 11/073,886, Sep. 20, 2007, Non-Final Office Action.
U.S. Appl. No. 11/073,886, Apr. 8, 2008, Non-Final Office Action.
U.S. Appl. No. 11/073,886, Nov. 20, 2008, Non-Final Office Action.
U.S. Appl. No. 11/074,109, Jun. 9, 2009, Final Office Action.
U.S. Appl. No. 11/074,109, Sep. 24, 2009, Non-Final Office Action.
U.S. Appl. No. 11/074,109, Apr. 19, 2010, Non-Final Office Action.
U.S. Appl. No. 11/074,109, Sep. 29, 2010, Final Office Action.
U.S. Appl. No. 11/074,109, Feb. 17, 2011, Office Action.
U.S. Appl. No. 11/320,034, Jul. 25, 2008, Office Action.
U.S. Appl. No. 11/320,034, Jan. 27, 2009, Notice of Allowance.

* cited by examiner

Access Entry
Definition *300*

| E7 | M6 | M5 | D4 | R3 | R2 | W1 | W0 | Access Settings *310* | Abbreviation *320* |
|---|---|---|---|---|---|---|---|---|---|
| 1 | 0 | 0 | x | x | x | x | x | Non volatile Memory | MN |
| 1 | 0 | 1 | x | x | x | x | x | Volatile Memory | MV |
| 1 | 1 | 0 | x | x | x | x | x | Processor Attention 0 (volatile mem) | MA0 |
| 1 | 1 | 1 | x | x | x | x | x | Processor Attention 1 (volatile mem) | MA1 |
| 1 | x | x | 0 | x | x | x | x | Device ID 0 | D0 |
| 1 | x | x | 1 | x | x | x | x | Device ID 1 | D1 |
| 1 | x | x | x | 0 | 0 | x | x | Read by All (not protected) | RA |
| 1 | x | x | x | 0 | 1 | x | x | Read by Password 1 or 2 or 3 | R1 |
| 1 | x | x | x | 1 | 0 | x | x | Read by Password 2 or 3 | R2 |
| 1 | x | x | x | 1 | 1 | x | x | Read by Password 3 | R3 |
| 1 | x | x | x | x | x | 0 | 0 | Write by All (not protected) | WA |
| 1 | x | x | x | x | x | 0 | 1 | Write by Password 1 or 2 or 3 | W1 |
| 1 | x | x | x | x | x | 1 | 0 | Write by Password 2 or 3 | W2 |
| 1 | x | x | x | x | x | 1 | 1 | Write by Password 3 | W3 |

*Fig. 3*

Memory Configuration Tables *500*

Main Table *501*

| T | | *502* | |
|---|---|---|---|
| MN | D0 | R3 | W3 |
| MN | D0 | R3 | W3 |
| MN | D0 | R3 | W3 |
| MN | D0 | R3 | W3 |
| MN | D0 | R3 | W3 |
| MN | D0 | R3 | W3 |
| MN | D0 | R3 | W3 |
| MN | D0 | R3 | W3 |
| MN | D0 | R3 | W3 |
| MN | D0 | R3 | W3 |
| MN | D0 | R3 | W3 |
| MN | D0 | R3 | W3 |
| MN | D0 | R3 | W3 |
| MN | D0 | R3 | W3 |
| T | | *506* | |

Lower-Level Table *502*

| MN | D0 | RA | W1 |
|---|---|---|---|
| MN | D0 | RA | W1 |
| MN | D0 | RA | W1 |
| T | | *503* | |

Lower-Level Table *503*

| MN | D0 | RA | W3 |
|---|---|---|---|
| MN | D0 | RA | W3 |
| MN | D0 | RA | W3 |
| T | | *504* | |

Lower-Level Table *504*

| MV | D0 | R3 | WA |
|---|---|---|---|
| MV | D0 | R3 | WA |
| MV | D0 | R3 | WA |
| T | | *505* | |

*Fig. 5A*

Lowest-Level Table 505

| MA0 | D0 | R3 | WA |
|-----|----|----|----|
| MA1 | D0 | RA | W1 |
| -   | -  | -  | -  |
| -   | -  | -  | -  |

Lower-Level Table 506

| MN | D1 | RA | W3 |
|----|----|----|----|
| MN | D1 | RA | W3 |
| MN | D1 | RA | W3 |
| T 507 | | | |

Lowest-Level Table 507

| MN | D1 | RA | W1 |
|----|----|----|----|
| MN | D1 | RA | W1 |
| MN | D1 | RA | W1 |
| MN | D1 | RA | W1 |

*Fig. 5B*

MULTI-LEVEL MEMORY ACCESS IN AN OPTICAL TRANSCEIVER

CROSS-REFERENCE TO RELATED APPLICATIONS

This application claims the benefit of U.S. Provisional Application No. 60/550,544, filed Mar. 5, 2004, which is incorporated herein by reference in its entirety.

BACKGROUND OF THE INVENTION

1. The Field of the Invention

The present invention relates generally to memory access. More specifically, the present invention relates to memory access in an optical transceiver that may be controlled on a per-segment basis.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier. For example, the controller may control laser calibration, transmission characteristics, debugging, laser bias current and the like Many optical transceivers are coupled to an external host processor through use of a host interface. The host interface allows the optical transceiver to communicate with an external host processor. Being coupled to the transceiver allows the external host processor to access and control many optical transceiver operational functions.

Therefore, it would be advantageous to control the amount of access the external host processor may have to the internal functions of the optical transceiver.

BRIEF SUMMARY OF THE INVENTION

The forgoing problems with the prior state of the art are overcome by the principles of the present invention, which relate to granting access to system memory in an optical transceiver on a per-segment basis. The optical transceiver includes a processing entity, a system memory and a memory access table. The memory access table contains multiple access entries. Each access entry defines at least one access condition for a corresponding segment of the system memory.

An external host processor, which is communicatively coupled to the optical transceiver, makes a request for access privileges to at least one segment of the system memory. The access privileges may be to read from or write to the segment of memory.

In response to receiving the request for access, the processing entity reads an access entry for a first segment of the system memory. The access entry, as mentioned, defines the access conditions of the memory segment. The processing entity is then able to determine whether or not the external host processor has access privileges for the memory segment based on the access conditions. For example, the processing entity may read in the memory access table access conditions that allow the external host processor to write data to the segment of memory. The processing entity then allows access to the requested memory segment if the access conditions are satisfied.

Different segments of memory may have different levels of access conditions required. For example, in addition to the first access entry for the first segment of system memory mentioned above, the processing entity reads a second access entry for a second segment of the system memory. The processing entity then determines whether or not the external host processor has access privileges for the second memory segment based on the second access conditions. The processing entity allows access to the requested memory segment if the access conditions are satisfied. These second access conditions may be much more lenient than the first access conditions, and may in fact be hierarchical, such that the second access conditions are satisfied by either of the first access conditions or some other conditions.

This allows for more flexibility in setting varying levels of access permissions in an efficient manner. Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3 illustrates access entry definitions that may be used to define access for various memory segments;

FIG. 5 illustrates a block diagram of a set of hierarchal memory access tables including indexes in accordance with embodiments of the present invention.

DETAILED DESCRIPTION OF THE PREFERRED EMBODIMENTS

The principles of the present invention relate to a method that enables an optical transceiver to grant access to its system memory on a per-segment basis in a hierarchical manner, such that some segments of memory may have more lenient access control, whereas others may be stricter. The optical transceiver includes a processing entity, system memory and a memory access table. The memory access table is comprised of access entries, each of which defines the access conditions for a corresponding segment of memory. The processing entity reads the access entries for a particular segment of the memory. The processing entity then determines whether or not to grant access to the memory segment based on the access entry read. The process may be repeated for multiple segments of memory. The access conditions may be hierarchically structured such that a more lenient access condition may be satisfied by either satisfying a more strict access condition, or by satisfying some other access condition.

An example operational optical transceiver environment will first be described. Then, the operation in accordance with the invention will be described with respect to the operational environment.

Figure 1:
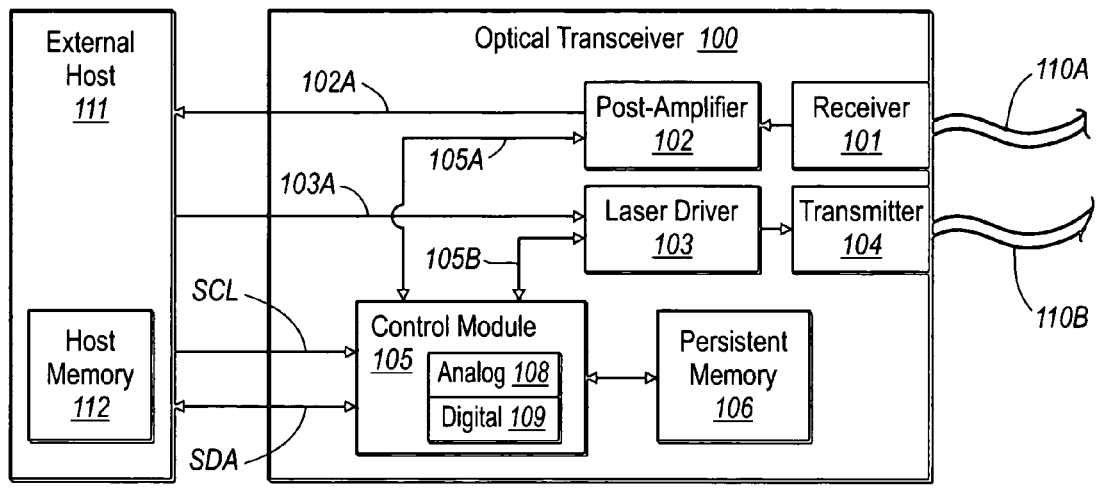
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 8G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant.

The control module 105 may have access to a persistent memory 106, which in one embodiment, is an Electrically Erasable and Programmable Read Only Memory (EEPROM). Persistent memory 106 may also be any other non-volatile memory source.

Data and clock signals may be provided from the host 111 to the control module 105 using the serial clock line SCL, and the serial data line SDA. Also data may be provided from the control module 105 to the host 111 using serial data line SDA to allow for digital diagnostics and readings of temperature levels, transmit/receiver power levels, and the like.

Figure 2:
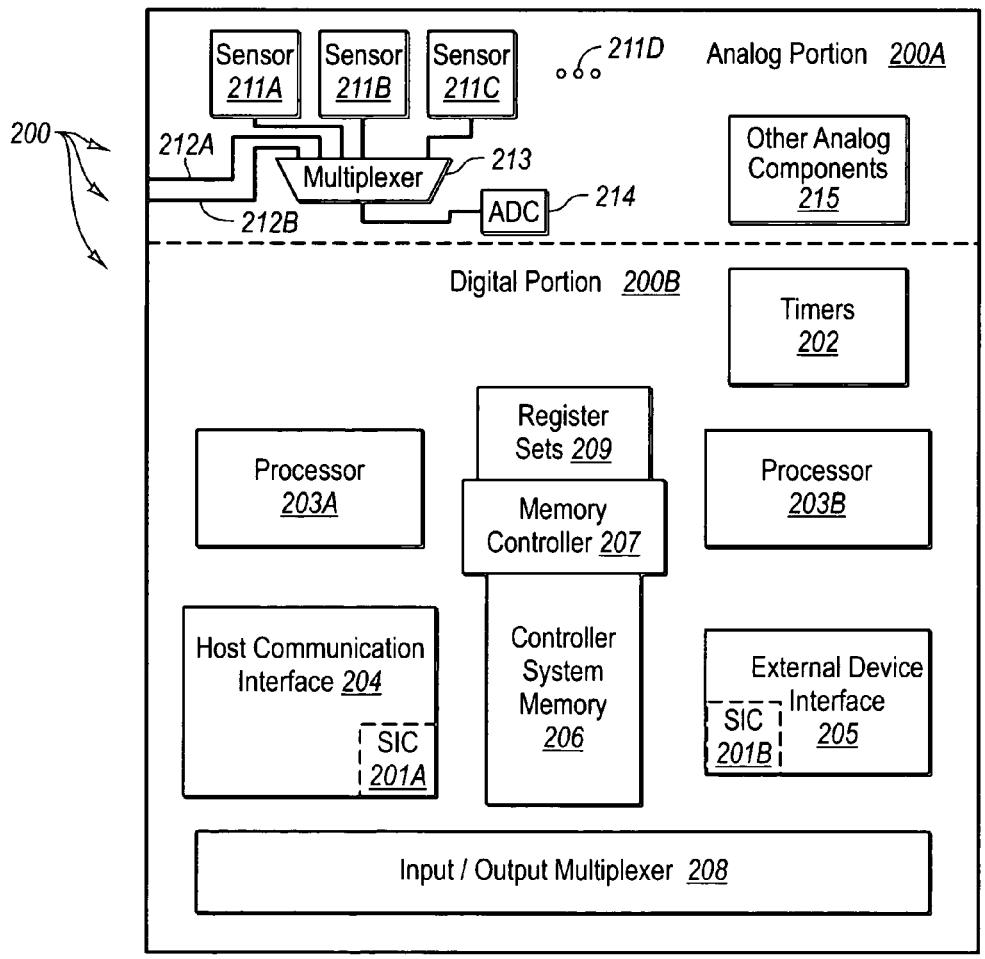
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components. The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111 using the serial data (SDA) and serial clock (SCL) lines of the optical transceiver 100. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or may be another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Register sets 209 contain a number of individual registers. These registers may be used by the processors 203 to write microcode generated data that controls high speed comparison in optical transceiver 100. Alternatively, the registers may hold data selecting operational parameters for comparison. Additionally, the registers may be memory mapped to the various components of optical transceiver 100 for controlling aspects of the component such as laser bias current or transmit power.

Having described a specific environment with respect to FIGS. 1 and 2, it will be understood that this specific environment is only one of countless architectures in which the principles of the present invention may be employed. As previously stated, the principles of the present invention are not intended to be limited to any particular environment and will be described with reference to the environment described in relation to FIGS. 1 and 2.

Accordingly, the principles of the present invention relate to a method that enables an optical transceiver to grant access in a hierarchically controlled manner to the system memory on a per-segment basis. While the system memory may be controller system memory 206 and may be RAM as previously described, it may also be a processor, a register, a flip-flop, non-volatile memory (such as persistent memory 106), or any other memory device.

The system memory or other memory location such as a register in register sets 209 may contain a memory access table that is used by optical transceiver 100 to grant access to individual segments of the system memory. Advantageously, the use of a memory access table gives optical transceiver 100 the ability to control access to large portions of the system memory (potentially the entire system memory) while only utilizing a very small portion of the memory for the granting of access process. The memory access table may be single table or it may consist of multiple tables.

The memory access table contains access entries that define the address and access conditions for a given segment of memory. For example, an access condition may define what conditions must be satisfied in order for an external host processor to have certain access privileges (e.g., read or write privileges).

Referring to FIG. 3, memory access entry definition 300 is shown as a one byte (eight-bit) entry, although this is not required. Memory access entry portion 300 is comprised of various access condition possibilities 310. The access conditions 310 may correspond to multi-level access to segments of memory. An abbreviation table 320 is also shown that defines abbreviations for the access conditions 310 that will be used in subsequent figures.

In accordance with the specific definition of FIG. 3, the seventh ($M_6$) and sixth ($M_5$) bits of memory access entry 300 are used to configure memory type for a given segment of memory. For example, the seventh bit $M_6$ defines whether processor attention is required (using, for example, a processor interrupt) when interfacing with that memory segment. A binary zero for bit $M_6$ indicates that no processor interrupt is used. In that case ($M_6$ being zero), bit $M_5$ identifies the type of memory, with a binary zero for $M_5$ indicating that the memory is to, be treated as non-volatile memory, and with a binary one for $M_5$ indicating that the memory is to be treated as volatile memory. A binary one for bit $M_6$ indicates that a processor interrupt is used. In that case ($M_6$ being one), bit $M_5$ determines various processor attention states or interrupts that are used to provide different levels of priority for providing an interrupt to a processor.

The fourth ($R_3$) and third ($R_2$) bits are used to configure multi-level access conditions for different levels of access permission needed to read the memory segment. For instance, if $R_3$ is zero and $R_2$ is zero, no password is needed to read the memory segment. If $R_3$ is zero and $R_2$ is one, read permission may be obtained using any one of three passwords (referred to herein as "password 1", "password 2" and "password 3"). If $R_3$ is one and $R_2$ is zero, read permission may be obtained by using two of the higher level passwords (e.g., password 2 or 3). If $R_3$ is one and $R_2$ is one, read permission may be obtained by using only the highest level password (e.g., password 3). Accordingly, the memory segments may be configured by implementing a four level password scheme for allowing a host computing system access to the readable segment of memory.

In like manner, the second ($W_1$) and first ($W_0$) bits are used to configure a segment of memory as writeable using the same four level password scheme. The same principles as discussed for the read bits apply to the write bits (i.e., there are two bits with four different combinations of binary ones and zeros possible). It is possible to independently configure a memory segment to be both readable and writeable for different password levels.

FIG. 3 also shows an eighth bit (E7) and a fifth bit (D4). Bit E7 may be used by embodiments that implement multiple memory configuration tables to identify the memory configuration table. In some embodiments, one portion of system memory is utilized by one device, and a second portion of system memory is utilized by a second device. Bit D4 identifies which of the two devices the memory location corresponds to. The two devices may be different I2C devices controlled by different host interfaces. For example, D0 may correspond to the first I2C device and D1 may correspond to the second I2C device.

Figure 4:
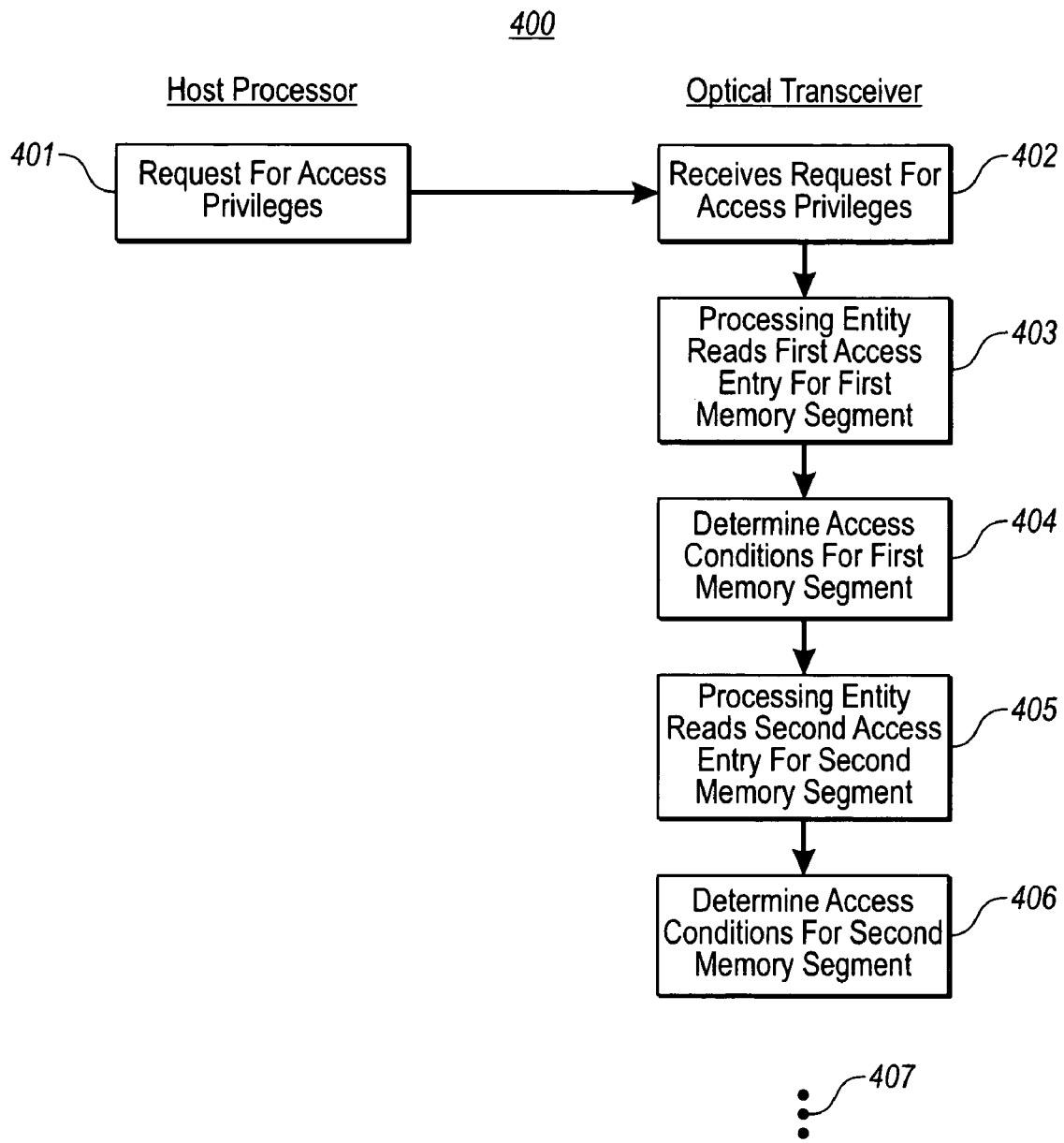
FIG. 4 illustrates a method for granting access to system memory on a per-segment basis in accordance with the principles of the present invention.

Referring to FIG. 4, a flowchart of a method 400 for an optical transceiver to grant access to the system memory in a hierarchical manner on a per-segment basis is depicted. An external host processor may be communicatively couplable to optical transceiver 100. In this description and in the claims, two entities are "communicatively couplable" if they are capable of being communicatively coupled with each other. In this description and in the claims, "communicatively coupled" is defined as being capable of communicating data either one way or bi-directionally. The external host processor may be a host computing system such as external host 111, some other computing system capable of providing new microcode to the optical transceiver; or any other device that is communicatively couplable with transceiver 100.

The external host processor makes a request to optical transceiver 100 for access privileges to a certain segment or multiple segments of controller system memory 206 (act 401). The request for privilege may be to read data stored in the segment of memory or it may be to write data to the memory segment or both.

In some embodiments, the request for access privileges is accomplished by the external host processor providing a password to the optical transceiver 100. The password may be written to a segment of controller system memory 206 or it may be written to a register in register sets 209. The control module 105 compares the received password with one or more predefined passwords that may be stored in controller system memory 206 or a register in register sets 209. The control module 105 establishes the level of access for the external host processor based on the comparison of the passwords. In some embodiments, as described above with respect to FIG. 3, there are three passwords corresponding to different access levels: access for all users (no password needed), authorized end user (lowest-level password), intermediate user (mid-level password), and optical transceiver manufacturer (highest level password). A user with the highest level password may access all segments of the system memory, while the lower level passwords may only allow access to portions of the system memory. The level of access for the requesting external host processor is then compared against the access conditions read by a processing entity as will be described.

The optical transceiver 100 receives the request for access privileges (act 402). In response to receiving the request, a processing entity reads a first access entry in a memory access table corresponding to a first memory segment of controller system memory 206 (act 403). In the claims and in the written description, "processing entity" is defined to mean a microprocessor such as a processor 203, a state machine, or any other processing device capable of reading a configuration table. As mentioned previously, the access entry defines a set of one or more access conditions such as read and write for the memory segment. Consequently, the use of terms "first", "second" and so forth to modify an access entry or a memory segment is not intended to represent any sequential, temporal or spatial ordering of the access entries or memory segments, but is used merely to distinguish one access entry or memory segment from another.

The processing entity then determines access conditions for the first memory segment based on the access entry read. (act 404). For example, the processing entity may read in the memory access entry access conditions for allowing the external host processor to read the memory segment. The processing entity uses the reading to make the memory segment readable by the external host processor. In embodiments that implement the password scheme previously described, the optical transceiver may use the password to determine the access conditions for the requesting external host processor.

The processing entity then reads a second access entry in the memory access table corresponding to a second segment of controller system memory 206 (act 405). The access entry defines a set of access conditions for the second memory segment that may be different from the set of access conditions for the first segment of memory.

Finally, the processing entity determines access conditions for the second memory segment based on the second access entry read (act 406). For example, the processing entity may read in the memory access entry an access condition for allowing the external host processor to write data to the memory segment. The processing entity uses the reading to make the memory segment writable by the external host processor. Although only described for two memory segments, the method may also be performed on as many segments of system memory (as represented by the vertical ellipses 407) for which there is a corresponding memory configuration entry in the memory configuration table.

In addition, the second access condition may be met by satisfying the first access condition or another access condition. For example, in embodiments that utilize a multi-level password scheme as described with regards to FIG. 3, a user such as a transceiver manufacturer may satisfy an access condition for a first memory segment using a high-level access password 3. Access to a different segment of memory may also be granted by the high-level access password 3 (i.e., the same access condition as the first access condition) as well as alternatively by an intermediate-level access password 2 (i.e., another access condition). Access to yet a different segment of memory may also be granted by providing the high-level access password 3, the intermediate-level access password 2, or by a low-level access password 1. In this way, multi-level access (i.e., more than one user or password having access) to a particular segment of memory is enabled. Some segments of memory may be accessed by all three passwords.

Having described a general method for granting access to the system memory on a per-segment basis, specific embodiments will now be described with greater detail. Some embodiments, as mentioned, implement a memory access table that comprises multiple tables. These multiple tables may be implemented as a plurality of hierarchical tables. The plurality of hierarchical tables includes one or more lower-level tables. A main table includes indexes that index into the lower-level tables. The lower-level tables may have indexes that index into additional lower-level tables. The lower-level tables have increasing granularity in that each access entry corresponds to a smaller and smaller amount of system memory. In this way it is possible to grant access to each segment of system memory on a byte-by-byte basis if necessary.

Referring to FIG. 5 (represented as FIGS. 5A and 5B due to the size of the hierarchical tables), an example set of hierarchical tables 500 is shown by way of illustration only and should not be read to limit any claims. A main table 501 covers the entire system memory, or at least the entire portion that may be accessible by multiple external host processors. In this example, the potentially accessible memory is approximately 2K bytes. The memory access abbreviations 320 of FIG. 3 are used in the figures to depict the access conditions. As illustrated in FIG. 3, there may be three different passwords that correspond to different users. Password 1 may correspond to an end-user, password 2 to an intermediary user, and password 3 to the optical transceiver manufacturer.

In main table 501, there are sixteen entries shown, each covering a memory segment of 128 bytes. All entries but the first and sixteenth entries have access conditions shown that indicate that the memory segments are non-volatile memory (i.e., "MN"), cover device one (i.e., "D0"), and are both readable and writeable using password 3 (i.e., "R3" and "W3"). These main entries require relatively little access information since four bytes of access conditions may be used to define the level of access for the 128 byte segments. Of course, the size of the segments may be much larger including entire kilobytes, megabytes, or gigabytes, or so forth. However, the first and sixteenth entries contain indexes that index into lower-level tables having more refined granularity. In this case, the first entry of main table 501 indexes into lower-level table 502 while the sixteenth entry of the main table indexes into lower level table 506.

Lower-level table 502 has four entries that define the level of access for memory segments that are 32 bytes in size. In this case, the access conditions indicate that the memory segments are non-volatile memory, cover device one, and are both readable by all (i.e., "RA") and writeable by password 1 (i.e., "W1"). However, the fourth, entry contains an index to an even lower-level table 503 having even more refined granularity.

For instance, lower-level table 503 has four entries that define the level of access for memory segments that are only eight bytes in size. In this case, the access conditions indicate that the memory segments are non-volatile memory, cover device one, and are both readable by all, and writeable by password 3. However, the fourth entry contains an index to a lower-level table 504 having more refined granularity.

Lower-level table 504 has four entries that define the level of access for memory segments that are only two bytes in size. These entries also require relatively high access information since four bytes of configuration information may be used to define access for the two byte segments. In this case the access conditions indicate memory segments that are volatile memory, cover device one, are readable by password 3, and are writeable by all (i.e., "WA"). However, the fourth entry contains an index to a lowest-level table 505 having very refined granularity of just one byte.

Lowest-level table 505 has two entries that define the level of access for memory segments that are a mere one byte in size. These entries require the highest level of access information since four bytes of access information is used to define access for the one byte segments. The first entry has access conditions indicating a memory segment that produces a processor interrupt whenever the memory segment is written to or read (i.e., "MA0"), is readable by password 3, and is writable by all. The second entry has access conditions indicating a memory segment that produces a processor interrupt whenever the memory segment is written to or read (i.e., "MA1"), is readable by all, and is writable by password 1.

In like manner, lower-level table 506 has four entries that cover segments of memory that are 32 bytes. The first three entries contain access conditions that indicate the level access for the entire 32 bytes of memory. In this case the access conditions indicate memory segments that are non-volatile memory, cover device two (i.e., "D1"), are readable by all, and are writeable by password 3. However, the fourth entry contains an index to a lower-level table 507 having more refined granularity.

Lowest-level 507 has four entries that cover segments of memory that are eight bytes. The entries contain access conditions that indicate the level of access for the entire eight bytes of memory. In this case the access conditions indicate memory segments that are non-volatile memory, cover device two, and are both readable by all and writeable by password 1. However, there are no indexes to a lower table.

The hierarchal table just described is only one of countless ways that a hierarchal table system may be implemented. One of skill in the art will appreciate the versatility that this type of system provides in determining the size and number of the individual tables, the size of the memory segments covered by individual access entries and so on. The hierarchal tables allow for controlling access to the system memory on a per-segment basis down to a single byte if desired, or even further.

Accordingly, the principles of the present invention relate to granting access to memory on a per-segment basis. A memory access table is utilized, allowing for the control of access to large portions of memory while only using a very small amount of memory for the table. Access to the different memory segments may later be modified by changing the access entries contained in the access table. Access to the memory segments may be granted on a byte level if necessary. This leads to an efficient use of limited memory resources-and allows for access to the memory to be divided among multiple users. Accordingly, the principles of the present invention are a significant advancement in the art of controlling access to memory in optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of granting access to a system memory of an optical transceiver, the method comprising:
    an act of receiving a request from an external host processor for access privileges to at least one segment of the system memory of the optical transceiver;
    in response to receiving the request for access privileges for the external host processor:
        an act of a processing entity reading a first access entry of a memory access table of the optical transceiver, the first access entry defining an address of a first segment of the system memory of the optical transceiver and a first access condition for accessing the first segment of the system memory of the optical transceiver;
        an act of the processing entity determining external host processor access privileges for the first segment of the system memory of the optical transceiver based on the first access condition read;
        an act of the processing entity reading a second access entry of the memory access table, the second access entry defining an address of a second segment of the system memory of the optical transceiver and a second access condition for accessing the second segment of the system memory of the optical transceiver, wherein satisfaction of the second access condition satisfies the first access condition but satisfaction of the first access condition does not satisfy the second access condition; and
        an act of the processing entity determining external host processor access privileges for the second segment of the system memory of the optical transceiver based on the second access condition read,
    wherein the second segment of system memory stores at least a portion of code used to control an internal function of the optical transceiver, the internal function including at least one of evaluating operational circumstances of the optical transceiver and adjusting settings of a post amplifier and/or a laser driver in the optical transceiver, and
    wherein the request received from the external host processor includes data written to a third segment of the system memory prior to determining external host processor access privileges for the first or second segments of the system memory of the optical transceiver.

2. A method in accordance with claim 1, wherein the memory access table comprises a plurality of hierarchical memory access tables.

3. A method in accordance with claim 2, wherein the plurality of hierarchical memory access tables include one or more low-level memory access tables.

4. A method in accordance with claim 3, wherein one or more of the plurality of hierarchical memory access tables include indexes indexing into one or more low-level memory access tables.

5. A method in accordance with claim 1, wherein the processing entity is a state machine.

6. A method in accordance with claim 1, wherein the memory access table contains access conditions for accessing segments of the system memory utilized by at least two separate devices.

7. A method in accordance with claim 1, wherein the first access condition defines whether the external host processor may read corresponding first segment of the system memory of the optical transceiver.

8. A method in accordance with claim 1, wherein the first access condition defines whether the external host processor may write to the corresponding first segment of the system memory of the optical transceiver.

9. A method in accordance with claim 1, wherein the external host processor requests access privileges by providing a password to the optical transceiver.

10. A method in accordance with claim 9, wherein the optical transceiver compares the received password with the first access condition.

11. An optical transceiver in accordance with claim 1, wherein the memory access table includes a configuration entry defining configuration settings for a particular segment in the system memory of the optical transceiver, the configuration settings for the particular segment defining whether or not a write to the particular segment should trigger a processor interrupt in which in response to determining that an original value of the segment has been overwritten by the new value, the processor interrupt is triggered based on the configuration settings and the segment is restored to the original value.

12. An optical transceiver communicatively coupled to an external host processor, the optical transceiver comprising:
    a control module configured to perform one or more control functions including evaluating operational circumstances of the optical transceiver and/or adjusting settings of a post amplifier and/or a laser driver in the optical transceiver, the control module including:
        a processing entity;
        a system memory divided into memory segments to enable access to the memory on a per-segment basis;
        a memory access table having a plurality of access entries, each access entry for defining an access condition for a corresponding memory segment of the system memory;
    wherein granting access to the system memory of the optical transceiver comprises:
        receiving a request from the external host processor for access privileges to at least one segment of the system memory of the optical transceiver, the at least one segment of the system memory storing code used by the control module to perform the one or more control functions;
        in response to receiving the request for access privileges for the external host processor:
            the processing entity reading a first access entry defining a first access condition for accessing a first segment of the system memory of the optical transceiver;
            the processing entity determining host processor access privileges for the first segment of the system memory of the optical transceiver based on the first access condition read;
            the processing entity reading a second access entry defining a second access condition for accessing a second segment of the system memory of the optical transceiver, wherein satisfaction of the second access condition satisfies the first access condition but satisfaction of the first access condition does not satisfy the second access condition; and
            the processing entity determining host processor access privileges for the second segment of the system memory of the optical transceiver based on the second access condition read, wherein the memory access table contains access conditions for accessing segments of the system memory utilized by at least two separate devices.

13. An optical transceiver in accordance with claim 12, wherein the memory access table comprises a plurality of hierarchical memory access tables.

14. An optical transceiver in accordance with claim 13, wherein the plurality of hierarchical memory access tables include one or more low-level memory access tables.

15. An optical transceiver in accordance with claim 14, wherein one or more of the plurality of hierarchical memory access tables include indexes indexing into one or more low-level memory access tables.

16. An optical transceiver in accordance with claim 12, wherein the processing entity is a state machine.

17. An optical transceiver in accordance with claim 12, wherein the first access condition defines whether the external host processor may read the corresponding first segment of the system memory of the optical transceiver.

18. An optical transceiver in accordance with claim 12, wherein the first access condition defines whether the external host processor may write to the corresponding first segment of the system memory of the optical transceiver.

19. An optical transceiver in accordance with claim 12, wherein the external host processor requests access privileges by providing a password to the optical transceiver.

20. An optical transceiver in accordance with claim 19, wherein the optical transceiver compares the received password with the first access condition.

21. An optical transceiver communicatively coupled to a local host external to the optical transceiver, the optical transceiver comprising:
   a processing entity;
   a system memory divided into memory segments to enable access to the memory on a per-segment basis; and
   a memory access table having a plurality of access entries, each access entry for defining an access condition for a corresponding memory segment of the system memory, wherein the memory access table contains access conditions for accessing segments of the system memory utilized by at least two separate devices,
   wherein the optical transceiver has a form factor that complies with a standard optical transceiver form factor definition so as to fit within a standard-sized opening of the local, external host and to provide a communications interface between the local, external host and other nodes in a network, and
   wherein granting access to the system memory of the optical transceiver comprises:
      receiving a request from the local external host for access privileges to at least one segment of the system memory of the optical transceiver;
      in response to receiving the request for access privileges for the local, external host:
         the processing entity reading a first access entry defining a first access condition for accessing a first segment of the system memory of the optical transceiver;
         the processing entity determining host processor access privileges for the first segment of the system memory of the optical transceiver based on the first access condition read;
         the processing entity reading a second access entry defining a second access condition for accessing a second segment of the system memory of the optical transceiver, wherein satisfaction of the second access condition satisfies the first access condition but satisfaction of the first access condition does not satisfy the second access condition; and
         the processing entity determining host processor access privileges for the second segment of the system memory of the optical transceiver based on the second access condition read,
      wherein the first and second access conditions each comprise a one byte entry in the memory access table, and
      wherein the request received from the local, external host includes data written to a third segment of the system memory prior to determining host processor access privileges for the first or second segments of the system memory of the optical transceiver.

22. An optical transceiver in accordance with claim 21, wherein the standard optical transceiver form factor definition is one of XFP, SFP, and SFF.

23. An optical transceiver in accordance with claim 21, wherein the optical transceiver is configured to interface with the local, external host via a serial clock line and a serial data line.

24. An optical transceiver in accordance with claim 23, wherein the optical transceiver is configured to provide digital diagnostics data to the host via the serial data line, the digital diagnostics data including at least one of a temperature level reading, a transmit power level reading, and a receive power level reading.

* * * * *